United States Patent [19]

Kojima

[11] 4,023,361

[45] May 17, 1977

[54] CATALYST FOR CONTROLLING POISONOUS EXHAUST GAS

[76] Inventor: Toshihiko Kojima, 17-1, Higashikawashimacho, Hodogaya, Yokohama, Japan

[22] Filed: Aug. 2, 1974

[21] Appl. No.: 494,049

Related U.S. Application Data

[63] Continuation-in-part of Ser. No. 292,551, Sept. 27, 1972, abandoned.

[52] U.S. Cl. ............................. 60/302; 123/119 E
[51] Int. Cl.² ..................... F01N 3/15; F02M 25/06
[58] Field of Search ............ 60/302, 304, 305, 299; 123/119 E

[56] References Cited

UNITED STATES PATENTS

| 1,815,178 | 7/1931 | Balachowsky | 123/119 E |
| 2,263,318 | 11/1941 | Tifft | 60/305 |
| 2,899,949 | 8/1959 | Hicks | 123/119 E |
| 3,017,255 | 1/1962 | Norris | 60/302 |
| 3,354,635 | 11/1967 | Guarnaschelli | 60/302 |
| 3,613,359 | 10/1971 | Posh | 60/305 |

FOREIGN PATENTS OR APPLICATIONS

| 47-23617 | 7/1972 | Japan | 60/299 |
| 965,454 | 7/1964 | United Kingdom | 123/119 E |

*Primary Examiner*—Douglas Hart
*Attorney, Agent, or Firm*—Whittemore, Hulbert & Belknap

[57] ABSTRACT

A catalytic converter for treating poisonous exhaust gases from an engine consisting essentially of highly purified copper. The catalytic converter is produced as an elongated, generally cylindrical body having a helically threaded outer surface and is mounted between a cylinder head and a manifold.

4 Claims, 11 Drawing Figures

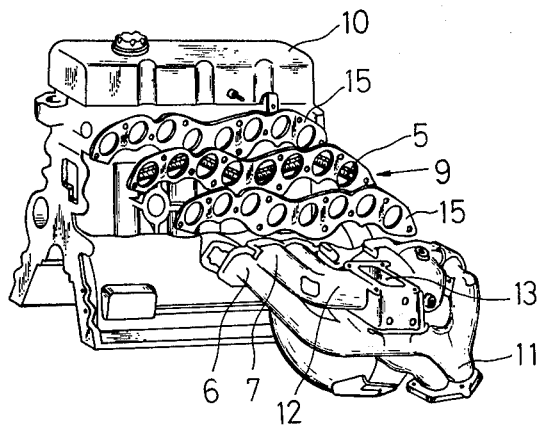

CATALYST FOR CONTROLLING POISONOUS EXHAUST GAS

This application is a continuation-in-part of my application Ser. No. 292,551, filed Sept. 27, 1972, now abandoned.

BACKGROUND OF THE INVENTION

In principle, hydrocarbons which are the main constituent of petroleum fuel should react with oxygen according to the theoretical chemical equation, $$C_mH_n + (m+n/4)O_2 \rightarrow mCO_2 + n/2 H_2O$$

By combustion in an engine. However, in addition to the combustion based on the above equation other chemical reactions also occur within the engine of a car. Namely, large quantities of carbon monoxide (CO) and gaseous hydrocarbons formed by combustion of petroleum are produced and exhausted from the engine. Nitrogen monoxide (NO) is also produced by combustion at high compression within the engine of the car. This NO reacts with $O_2$ in the atmosphere to form $NO_x$ an addition product of nitrogen dioxide.

Presently, methods for treating exhaust gases from cars include controlling the circulation of gas, controlling the amount of air introduced into the engine, reducing combustion of gases and an afterburner using particle catalyst. Metal particle catalysts have been applied in most conventional methods using a catalyst. But particle catalysts have disadvantages in that the efficiency of oxidation, the most important feature, is limited and the life of the catalysts is short. Metal particle catalyst, consisting of platinum are high in cost. Furthermore, the particle catalysts are easily poisoned due to the surfaces of the catalysts being covered with carbon, lead or aromatic hydrocarbons such as benzene, toluene and xylene. Therefore, further research is required to use metal particle catalysts practically.

It is because of the present nature of an internal combustion car engine that poisonous exhaust gases are released into the atmosphere. The combustion chamber of the engine is made in a flat shape in order to obtain high h.p. As the surface area of the combustion chamber is large compared with its volume, quenching occurs. The amount of CO produced is not influenced by the ratio of the surface area of the combustion chamber to its volume (S/V), but the amount of gaseous hydrocarbons is affected by this ratio. It is difficult to make the ratio less than 7 in the case of small engines. Besides the shape of the combustion chamber, the ratio S/V is also determined by the compression ratio, the ratio of stroke/bore, the number of cylinders, and the cylinder capacity of the engine. An engine having a low compression ratio, a long stroke, and a smaller number of cylinders exhausts less poisonous gases than a conventional small engine having a high rotation and large h.p. Although the volume ratio S/V is small when the shape of the engine is spherical, this alone is not effective to decrease the amount of poisonous exhaust gases.

SUMMARY OF THE INVENTION

This invention relates to a catalyst for catalytically converting poisonous gases from the combustion of petroleum fuel and in particular concerns a highly purified copper catalyst which includes a small quantity of other metals. The catalyst of the present invention is of a generally cylindrical form having a helically threaded outer surface.

It is an object of the present invention to provide a new catalytic convertor which is low in price, has a high degree of efficiency in controlling the exhaust gases and is not poisoned.

It is another object of the invention to provide a copper catalyst produced in a cylindrical form which is easy to mount in a car and has a large surface area.

It is a further object of the invention to provide a new catalytic convertor which is efficient to save fuel by mounting the catalytic convertor between an engine head and a manifold inserting it through both an exhaust manifold and intake manifold.

BRIEF DESCRIPTION OF THE DRAWING

Additional objects and advantages of the present invention will become apparent upon consideration of the following description when taken in conjunction with the accompanying drawings in which:

FIG. 8 is a perspective view of a cylinder head of an engine showing the method of mounting the catalytic converting device of the present invention;

FIG. 9 is a perspective view of the catalytic converting device of the present invention;

FIG. 10 is a schematic side view of an internal-combustion engine; and

FIG. 11 is a partly diagrammatic sectional view of the catalytic converting device of the present invention shown in FIG. 10.

DETAILED DESCRIPTION OF THE INVENTION

Figure 1:
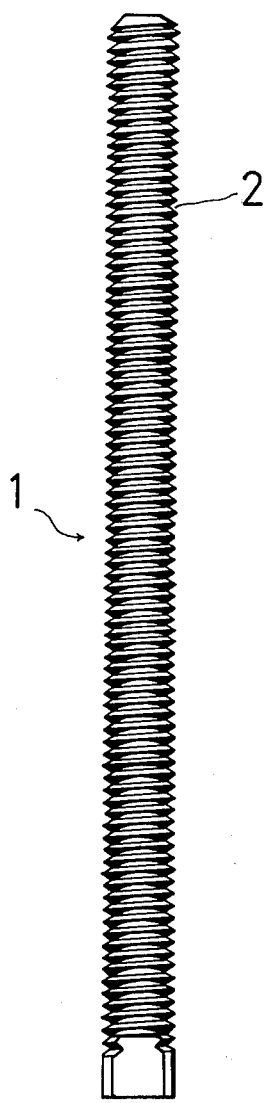
FIG. 1 is a side view of a preferred embodiment of the present invention.

The catalyst of the present invention consists essentially of highly purified copper. It may consist of highly purified copper and small amounts of other cheap metals such as manganese, nickel, iron, silver, aluminum etc., or it may consist of highly purified copper only. However, the catalyst which consists essentially of highly purified copper and a small quantity of the above metals is more advantageous.

Poisonous exhaust gases from combustion of petroleum fuel in internal combustion engines contain large amounts of CO, NO, and gaseous hydrocarbons which are harmful to health. The catalyst of the present invention is effective in converting these gases into gases which are harmless to health by cracking the gases by its specific catalytic effect. The catalytic reaction of conversion is promoted by the presence of the catalyst of the present invention at the temperature of the gaseous mixture coming in contact with the catalyst in an engine. Compared to known platinum catalysts, the catalyst of the present invention is much less susceptible to poisoning. Furthermore, the controlling efficiency is not greatly reduced with the lapse of time because hydrogen gas formed by the combustion of the hydrocarbons reduces the surface of the catalyst. Another advantageous feature of the catalyst is its heat resisting property which allows it to be used at the temperature of the exhaust gases coming out of the engine. The catalyst of the present invention is used advantageously at temperature of about 100°–350° C, though the preferred temperature is different for each different catalyst composition.

The catalyst of the present invention is produced in a cylindrical form having a helically threaded outer surface. The preferred embodiment of the present invention is best illustrated in the drawings.

Referring now to

Figure 2:
FIG. 2 is a plan view of the body shown in FIG. 1.
Figure 3:
FIG. 3 is a base view of the body shown in FIG. 1.

FIG. 1, FIG. 2 and FIG. 3 of the drawings there is shown the catalyst having a cylindrical body portion 1, a generally circular cross section, and a helically threaded outer surface 2.

Figure 4:
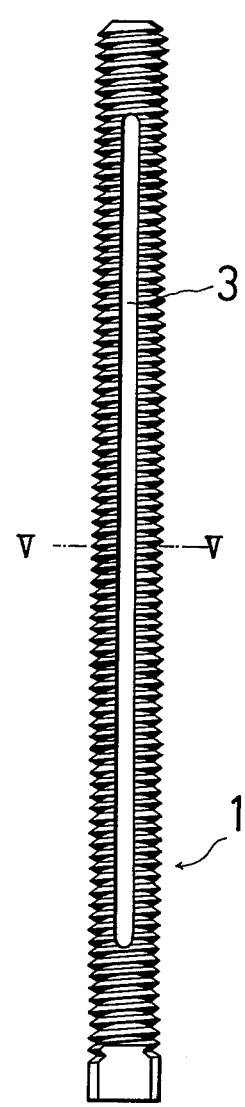
FIG. 4 is a side view of the second embodiment of this invention.
Figure 5:
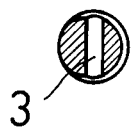
FIG. 5 is a cross-sectional view taken on line V—V in FIG. 4.

FIG. 4 and FIG. 5 show a second embodiment of the invention in which an opening 3 is provided in the body portion of the catalyst. Said opening 3 extends longitudinally of the cylindrical body 1, and extends entirely through the body, i.e., from the one surface to the opposite surface.

Figure 6:
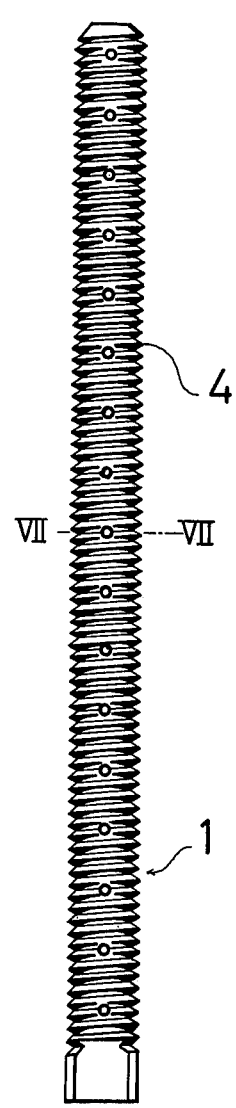
FIG. 6 is a side view of the third embodiment of this invention.
Figure 7:
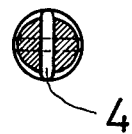
FIG. 7 is a cross-sectional view taken on lines VII—VII in FIG. 6.

FIGS. 6 and 7 show a third embodiment of this invention in which several holes 4 are bored through the catalyst in the direction transversely of the body 1. These holes likewise extend all the way through the body. When the catalyst of the invention is used on an automobile, it may be mounted on the intake member in the intake system or it may be mounted in a suitable position in the exhaust system, e.g., a position between an intake and exhaust manifold and a cylinder head. The helically threaded outer surface 2, the elongated opening 3 and the holes 4 serve to increase the surface area of the catalyst with which the exhaust gases come in contact. The opening 3 and the holes 4 also act to effect circulation of the exhaust gases. One way of mounting the catalyst is by screwing or inserting the catalyst in a suitable position between an intake and exhaust manifold and a cylinder head.

The most preferable method for mounting the catalytic converter of the present invention is shown in FIGS. 8 to 11. Threaded cylindrical catalyst 5 is inserted through both an exhaust pipe 6 and intake pipe 7 in the direction of the diameter of the pipes, i.e., radially through the pipes. Most conveniently, the threaded cylindrical catalysts 5 are mounted in a body 8 of catalytic converting device 9 as shown in FIG. 9. The two catalysts are mounted in a hole connected with exhaust or intake pipe and arranged parallel to the other being spaced apart by some distance. The catalytic converting device 9 is secured between the cylinder head 10 and the manifold including exhaust manifold 11 and intake manifold 12. A pipe 13 is connected with carburetor 14. Gasket 15 may be put between the catalytic converting device 9 and cylinder head 10, or the manifolds 11, 12 respectively.

According to the present invention, as the threaded cylindrical catalyst 5 is inserted through both an exhaust pipe 6 and intake pipe 7, the temperature of the exhaust gases from the engine is available for the reaction temperature required to control the exhaust gases not only in the exhaust pipe but also in the intake pipe. The catalyst of the present invention controls the exhaust gases most effectively when it is set in the exhaust pipe and intake pipe at the same time. When the catalysts are mounted as shown in FIGS. 9 and 11, fluid mixture of gasoline and air is passed through the catalyst 5 from carburetor 14 to combustion chamber 16, and then the fluid mixture is dispersed in smaller particles and vaporized. While, in the exhaust system, poisonous exhaust gases are converted to harmless gases by the catalytic effect of the present invention. If the exhaust pipe and the intake pipe are positioned apart from each other, the catalysts inserted in the pipes may be connected by cuprous wire to maintain the catalysts at the same temperature. The catalyst of the invention is easily inserted in the pipe because of the helically threaded outer surface 2. The catalyst may be mounted by inserting and screwing the end of the cylindrical body 1 at a suitable position in the pipe. It is possible to produce the catalyst having 500 kg/cm³ strength resistance by compressive molding.

The catalyst of the present invention is cheaper than catalysts in such forms as plates, pellets and particles considering its efficiency and life. The catalyst of the present invention effectively changes poisonous exhaust gases to non-poisonous ones. When the main purpose is to remove $NO_{2x}$ from the gas exhausted by car, 99.9% of NO can be removed by placing the catalyst of the present invention in a position adjacent to a main muffler. Since the catalyst promotes the reduction of NO or $NO_2$ to $N_2$ and $O_2$, the nitrogen oxide adduct $NO_x$ or $NO_{2x}$ which is the most important factor of polluting the atmosphere, is not formed in the air.

The catalyst of this invention can be also used advantageously to control the poisonous gases exhausted from a gas boiler, autobike etc.

EXAMPLE 1

A catalyst consisting of the following metals was produced in a shape shown in FIG. 6 and FIG. 7 having a diameter of 8 mm and a length of 110 mm.

| | |
|---|---|
| Cu (free from oxygen) | 99.99 % (wt.) |
| Fe | 0.005 % |
| Ag | 0.0005 % |
| Ni | 0.004 % |

Twelve of the above mentioned catalysts were arranged and set on an intake and an exhaust manifold of a used car. In order to remove NO from the exhaust gas ten catalysts having a diameter of 2 – 3 mm were also set adjacent to a main muffler. In this example the following engines were used: "Sedric", 2000 cc, 4 cycle and 6 cylinder capacity; "Mark II", 1600 cc, 4 cycle and 4 cylinder capacity, and used "Calora", 1200 cc, 4 cycle and 4 cylinder capacity. The catalysts were removed and investigated after running for 17,320 km. The catalysts still maintained their catalytic properties. The concentration of exhaust gases was found to be as follows;

| | (I) | (II) |
|---|---|---|
| CO | 4.1 % (wt.) | 0.06 % (wt.) |
| hydrocarbons | 1000 ppm | 108 ppm |
| NO | 1500 – 1000 ppm | 269 ppm |

In the table above, (I) is a comparative value when the catalyst of this invention had not been used and (II) is the value when the catalyst of the present invention was employed and the concentration was measured three times each month. Using the catalyst of the present invention the concentrations were found to be approximately the same over the test period. The value was measured by using an infrared analyzer.

EXAMPLE 2

Mode test was employed. The catalytic converting device of the present invention is mounted between cylinder head and manifold. Exhaust gases were purified by the catalyst.

Test car
Name and type: Datsun B110
Chassis No.: B110 232748
Type of Engine: A-10
Weight of vehicle: 665 kg
Gross weight of vehicle: 990 kg
Total displacement: 988 cc
Initial registration: 1969
Maximum developed power: 56 PS/6000 rpm
Inertial mass in terms of drive shaft: 1000 kg
Final reduction gear ration: 3,900
Effective radius of tire: 237 mm
Mileage: 23,151 km
Concentration of CO while engine is idling: 0.16%

Fuel - Maruzen Regular
Lubricating oil - Honda Ultra Oil

Testing device
Chassis dynamo meter
Name and type: Iyasaka CDM-5
Rated torque: 150 kg.m
Maximum absorption horsepower: 200 PS
Maximum number of revolution: 2500 rpm
Equivalent inertial mass: 500 - 3000 kg
Diameter of roller: 370 mm Measuring device
(a) Gas anaylsis meter
Name and type: MEXA-2200

| Gas | Mode | Measuring range |
|---|---|---|
| CO | NDIR | 0 – 10 % |
| $CO_2$ | NDIR | 0 – 16 % |
| HC | FID | 0 – 25000 ppm |
| $NO_x$ | CLD | 0 – 5000 ppm |

Mode Test
(A) Concentration of exhaust gas in the front part of the device.
(B) Concentration of exhaust gas in the rear part of the device.

| Gas | Unit | Running Condition | 1st time (A) | (B) | 2nd time (A) | (B) | 3rd time (A) | (B) | 4th time (A) | (B) | 5th time (A) | (B) |
|---|---|---|---|---|---|---|---|---|---|---|---|---|
| CO | % | Idling | — | 0.02 | — | 0.03 | — | 0.05 | — | 0.05 | — | 0.05 |
| | | Accelerating | — | 0.67 | — | 0.46 | — | 0.44 | — | 0.46 | — | 0.35 |
| | | Constant speed | — | 0.17 | — | 0.16 | — | 0.13 | — | 0.14 | — | 0.13 |
| | | Deceleration | — | 0 | — | 0.01 | — | 0 | — | 0.01 | — | 0.01 |
| | | Total | — | 0.86 | — | 0.66 | — | 0.62 | — | 0.66 | — | 0.54 |
| HC | ppm | Idling | — | 156 | — | 223 | — | 246 | — | 293 | — | 247 |
| | | Accelerating | — | 439 | — | 494 | — | 481 | — | 547 | — | 510 |
| | | Constant speed | — | 444 | — | 446 | — | 462 | — | 518 | — | 487 |
| | | Deceleration | — | 28 | — | 31 | — | 32 | — | —30 | — | 30 |
| | | Total | — | 1067 | — | 1194 | — | 1221 | — | 1388 | — | 1274 |
| $NO_x$ | ppm | Idling | — | 8 | — | 12 | — | 11 | — | 14 | — | 14 |
| | | Accelerating | — | 463 | — | 533 | — | 554 | — | 432 | — | 520 |
| | | Constant speed | — | 920 | — | 1008 | — | 1084 | — | 1028 | — | 976 |
| | | Deceleration | — | 15 | — | 11 | — | 16 | — | 17 | — | 19 |
| | | Total | — | 1406 | — | 1564 | — | 1665 | — | 1491 | — | 1529 |
| $CO_2$ | % | Idling | — | 1.63 | — | 1.61 | — | 1.59 | — | 1.60 | — | 1.60 |
| | | Accelerating | — | 4.57 | — | 4.78 | — | 4.80 | — | 4.81 | — | 4.89 |
| | | Constant speed | — | 7.62 | — | 7.63 | — | 7.66 | — | 7.67 | — | 7.66 |
| | | Deceleration | — | 0.29 | — | 0.29 | — | 0.29 | — | 0.27 | — | 0.29 |
| | | Total | — | 14.11 | — | 14.31 | — | 14.34 | — | 14.35 | — | 14.44 |

EXAMPLE 3

10-mode test was employed.

Test Condition
(1) Test car (brought in by the requestor)
Name and type: Ford Cortina FN2
Chassis No.: BABFNM78869
Type of engine: N2
Weight of vehicle: 1,070 kg
Gross weight of vehicle: 1,345 kg
Total displacement: 1,990 cc
Initial registration: July 1973
Maximum developed power: 110 PS/6,000 rpm
Inertial mass in terms of propeller shaft: 1,250 kg
Final reduction gear ratio: 3,700
Effective radius of tire: 276 mm
Mileage: 9,400 km
Concentration of CO while engine is idling: 0.55%

(2) Fuel/Lubricating oil
(a) Fuel
Brand: Mitsubishi Super Gasoline

Octane rating: (F-1) 91.0

4-ethyl lead: 0.111 ml/l

Gum: — mg/100cc

50%: 110.0° C  90%: 153.0° C
(b) Lubricating oil
Brand: Honda Ultra Oil

Specific gravity: (15/4° C) 0.7499

Steam pressure: (37.8° C) 0.74 kg/cm²

Quantity of lead: — g/100.1

Fractional distillation property: Initial distillation: 29.0° C  10%: 56.0° C
95%: 163.0° C  End point: 182.0° C Standard: —

(3) Testing device
Chasis dynamo meter
Name and type: Iyasaka CDM-5
Maximum number of revolution: 2500 rpm

| Rated torque : 150 kg.m | Equivalent inertial mass: 500 – 3000 kg |
|---|---|
| Maximum absorption horsepower: | |
| 200 PS | Diameter of roller: 370 mm |

(4) Measuring device
    (a) Gas analysis meter
        Name and type: MEXA-2200

| Gas | Mode | Measuring Range |
|---|---|---|
| CO | NDIR | 0 – 0.3% 0 – 1.0% 0 – 3% 0 – 10% |
| $CO_2$ | NDIR | 0 – 5% 0 – 16% |
| HC | FID | 0 – 50ppm X 1, 2, 5, 10, 20, 50, 100, 200, 500 |
| $NO_x$ | CLD | 0 – 10ppm X 1, 2, 5, 10, 20, 50, 100, 200, 500 |

(b) Temperature measuring instrument: None
    (c) Other measuring instruments:
        Automatic fuel consumption meter (Made by Ono Instruments Manufacturing
        Company (Ono Sokki), Type: DFM-140XS)

Test result
    The results of the 10-mode test that was made without the device
    mounted are shown in (5) and (6) and those with the device mounted are shown
    in (7) and (8).

Without the device mounted:

(5) Test conducted when engine is idling:
    Atmospheric pressure: 752 mmHg      Room air temp: 26.0° C Humidity: 70%
    Number of idle revolutions: 600 rpm      Cooling water temperature: 80.0° C
    Sucking negative pressure: 390 mmHg      Lubricating oil temperature: 80.0° C
    * CO    0.55%    $CO_2$    13.92%    HC    500 ppm
    * In case secondary air was taken into the exhaust system, the value
    was corrected.
    HC was shown by T.HC/6 in terms of hexane.

(6) Exhaust gas when engine is in running condition:

| | Time | Atmospheric pressure | Room air temp. | Humidity | Cooling water temp. | Lub. oil temp. |
|---|---|---|---|---|---|---|
| Beginning of test | 15:55 | 752 mmHg | 26.0° C | 70% | 80.0° C | 80.0° C |
| End of test | 16:10 | 752 mmHg | 26.0° C | 70% | 80.0° C | 80.0° C |

Gas in the collecting pack:
CO    0.0435%    HC    146.5 ppm    $NO_x$    89ppm
Number of pump revolutions while collecting gas: 8424
Inflow of gas per pump revolution: 6.329 liter
Temperature of dilute gas flows into pump: 308° K
Pressure decrease of dilute gas flows into pump, from atmospheric pressure:
                                                                                                                                                                                                         156 mmAq Fuel consumption (5 cycle average): 86.2 cc
Speed of vehicle when chassis dynamo meter is on-load: 40 km/h
Sucking negative pressure: 440 mmHg
Weight of exhaust gas per running distance of 1 kilometer:
    CO      7.57 g/km
    HC      1.26 g/km
    $NO_x$      3.26 g/km

With the device mounted:

(7) Test conducted when engine is idling:
    Atmospheric pressure: 753 mmHg      Room air temp: 23.0° C Humidity: 57%
    Number of idle revolutions: 620 rpm      Cooling water temperature: 80.0° C
    Sucking negative pressure: 350 mmHg      Lubricating oil temperature: 80.0° C
    * CO    0.55%    $CO_2$    13.44%    HC    320 ppm
    * In case secondary air was taken into the exhaust system, the value
    was corrected.
    HC was shown by T.HC/6 in terms of hexane.

(8) Exhaust gas when engine is in running condition:

| | Time | Atmospheric pressure | Room air temp. | Humidity | Cooling water temp. | Lub. oil temp. |
|---|---|---|---|---|---|---|
| Beginning of test | 13:40 | 753 mmHg | 23.0° C | 57% | 80.0° C | 80.0° C |
| End of Test | 14:00 | 753 mmHg | 23.0° C | 57% | 80.0° C | 80.0° C |

Gas in the collecting pack:

-continued

```
CO    0.039%   HC    138 ppm   NOₓ   68 ppm
Number of pump revolutions while collecting gas: 8428
Inflow of gas per pump revolution: 6.329 liter
Temperature of dilute gas flows into pump: 308° K
Pressure decrease of dilute gas flows into pump, from atmospheric pressure:
                                                                         155 mmAq
    Fuel consumption (5 cycle average): 85.4 cc
    Speed of vehicle when chassis dynamo meter is on-load: 40 km/h
    Sucking negative pressure: 440 mmHg
    Weight of exhaust gas per running distance of 1 kilometer:
         CO      6.80 g/km
         HC      1.19 g/km
         NOₓ     2.02 g/km
```

While in the foregoing there has been described and shown the preferred embodiment of this invention, various modifications may become apparent to those skilled in the art to which the invention relates. Accordingly it is to be understood that the present invention is not limited to this specific disclosure but includes various modifications and equivalents thereof.

What is claimed is:

1. A catalytic converting device comprising a body block adapted to be inserted between an engine block and the intake and exhaust manifolds which are normally directly attached to said engine block, said body block having at least one opening extending therethrough in alignment with corresponding passageways in said engine and manifold respectively to permit normal passage of engine gas therethrough, and at least one threaded metal cylinder passing through said body block opening in a direction transverse to the direction of gas flow through said block opening, said metal cylinder being threadedly secured to said body block and in heat conducting relation to both intake and exhaust gases passing between said manifolds and said engine block, said metal cylinder having the surface thereof exposed to said engine gases composed of a catalytic material consisting essentially of highly purified copper.

2. A catalytic converting device according to claim 1 in which said body block has at least two openings, one aligned with an intake manifold and the other aligned with an exhaust manifold, and each opening is provided with a threaded metal cylinder in heat conducting relation to the other metal cylinder.

3. A catalytic converting device according to claim 2 in which the same threaded metal cylinder extends through two adjacent gas openings, one for intake gas and the other for exhaust gas.

4. A catalytic converting device according to claim 3 in which there are two parallel metal cylinders extending across adjacent intake and exhaust openings in said body block.

* * * * *